United States Patent

Debesis et al.

[11] Patent Number: 5,831,759
[45] Date of Patent: Nov. 3, 1998

[54] ELECTRO-OPTIC MODULATOR WITH PASSIVATION LAYER

[75] Inventors: John R Debesis, Penfield; Wesley H Bacon, Rochester; Mark D Evans, Hamlin, all of N.Y.

[73] Assignee: Eastman Kodak Company, Rochester, N.Y.

[21] Appl. No.: 564,614

[22] Filed: Nov. 29, 1995

[51] Int. Cl.⁶ .................................................. G02F 1/03
[52] U.S. Cl. ........................................ 359/254; 359/322
[58] Field of Search .................................. 359/322, 323, 359/254, 255

[56] References Cited

U.S. PATENT DOCUMENTS

| | | | |
|---|---|---|---|
| 3,655,267 | 4/1972 | Forlini | 350/150 |
| 4,064,434 | 12/1977 | Waksberg | 250/199 |
| 4,377,753 | 3/1983 | Mir | 250/578 |
| 4,713,157 | 12/1987 | McMillan et al. | 204/192.11 |
| 4,895,290 | 1/1990 | Dunnrowicz et al. | 228/116 |
| 4,913,531 | 4/1990 | Efron | 350/342 |
| 4,961,633 | 10/1990 | Ibrahim et al. | 359/245 |
| 4,990,943 | 2/1991 | Phillips | 350/392 |
| 4,998,805 | 3/1991 | Agostinelli | 350/355 |
| 5,177,628 | 1/1993 | Moddel | 359/72 |
| 5,225,920 | 7/1993 | Kasazumi et al. | 359/69 |

FOREIGN PATENT DOCUMENTS

| | | |
|---|---|---|
| 2040489 | 1/1980 | United Kingdom . |
| WO 86/05002 | 4/1979 | WIPO . |

*Primary Examiner*—Georgia Y. Epps
*Assistant Examiner*—Dawn-Marie Bey
*Attorney, Agent, or Firm*—Nelson A. Blish

[57] ABSTRACT

An electro-optic modulator array (36). Electrode pairs 50 and 51 are mounted on a substrate (40). A layer of electronic grade glass (60) is deposited by electron beam evaporation on the substrate (40) and electrodes (50) and (51). In an alternate embodiment, an electronic grade of glass 50 is deposited on the PLZT substrate (40) prior to applying electrodes (50) and (51).

13 Claims, 2 Drawing Sheets

ELECTRO-OPTIC MODULATOR WITH PASSIVATION LAYER

FIELD OF THE INVENTION

The present invention relates to electro-optic modulators in general and, in particular, to an electro-optic modulator having a passivation layer of optical glass evaporated onto a ceramic substrate of the modulator.

DESCRIPTION OF THE PRIOR ART

Electro-optic modulators are used in output writers to produce high resolution, continuous tone images on color film. Output writers use three conventional tungsten halogen light sources which are filtered to produce blue, green and red light beams. Each of these beams is then passed through an electro-optic modulator.

Materials used in electro-optic modulators have properties which change according to the strength of an electric field established within the material. PLZT is an acronym for one such material, a transparent ceramic made from oxides of lead, lanthanum, zirconium, and titanium. When an electric field is induced in PLZT, it expands in one direction, contracts in another direction and changes optical transmission properties. Polarized light, transmitted through a PLZT substrate with an electric field established in the material, is rotated about its axis by an amount proportional to the electric field applied.

An electro-optic modulator 10 with surface electrodes is shown in FIG. 1. First electrodes 12 and second electrodes 13 form a plurality of pairs, mounted on a first surface of PLZT substrate 14. First electrodes 12 and second electrodes 13 have mirror image extensions on a second surface of PLZT substrate 14. Gaps 15, located between the electrodes 12 and 13, allow passage of light beams. A first polarizer 16, oriented at a 45° angle to an axis parallel to electrodes 12 and 13, polarizes a light beam 18. When electrodes 12 and 13 are off, the light beam 18 is transmitted through the substrate 14 and is blocked by second polarizer 20, which has a polarization axis oriented at a right angle to the polarization axis of the first polarizer 16.

When voltage is applied between the first and second electrodes 12 and 13, the PLZT substrate rotates the polarization vector of the light beam passing through the material. As the voltage to electrodes 12 and 13 is increased, the intensity of the light beam transmitted through the second polarizer 20 increases, until the polarization vector of the light beam 18 transmitted through the PLZT substrate is identical to that of the second polarizer 20. Further increases in voltage causes the intensity of the light beam 18 transmitted through the second polarizer 20 to decrease, as the polarization vector of the light beam is rotated past 90°. The voltage at which the light intensity transmitted through the second polarizer reaches a maximum, is called the half wave voltage. Electro-optic modulators with an electrode pattern, shown in FIG. 1, are used in film writers. For this type of electro-optical modulator, the half wave voltage is between 200 to 280 volts, at a wavelength of 450 nm.

PLZT is non-linear and its performance is a function of frequency. With the present modulators, voltages of up to 400 volts are necessary to achieve required contrast ratios at high frequencies, for example 100 kHz. In order to improve the efficiency of output writers, electro-optic modulators with faster response times are needed. However, as the frequency increases, the internal heating of these devices also increases. The temperature increase produces drift, variation in the light intensity transmitted through the modulator at a given voltage, which limits performance.

A PLZT substrate will build up surface charge and leakage currents if the surface is not passivated. Surface charges and leakage current are due to ionic species produced by temperature changes and absorbed water on the surface of the PLZT substrate. Passivation means to electrically inactivate the surface charge. It is known that acrylic lacquer passivates and prevents formation of ionic species on the substrate surface. A thin layer, several microns thick, of electronic grade acrylic lacquer is often spin-coated onto the PLZT substrate to passivate the substrate. For example, U.S. Pat. No. 4,998,805 specifies the use of acrylic coating No. MS-465, manufactured by Miller-Stephenson Corporation of Danbury, Conn. A disadvantage of this process is that the electro-optic modulator must be heated to more than 100° C. prior to application of the acrylic coatings.

SUMMARY OF THE INVENTION

The object of the present invention is to provide a non-organic passivation layer for an electro-optic modulator substrate. It is also an object of the present invention to provide a passivation layer for electro-optic modulators which can be applied without heating the PLZT substrate. Another object of the invention is to provide a passivation layer having a thermal expansion coefficient close to the thermal expansion coefficient for the PLZT substrate. For PLZT substrates the passivation layer should have a thermal expansion coefficient in the range of 4.0 to 6.8 micro-inches/inch –°C. In the present invention, an electronic grade glass is evaporated onto an electro-optic modulator substrate. The glass passivates the surface and also serves as an anti-reflection coating

DETAILED DESCRIPTION OF THE PREFERRED EMBODIMENT

Figure 1:
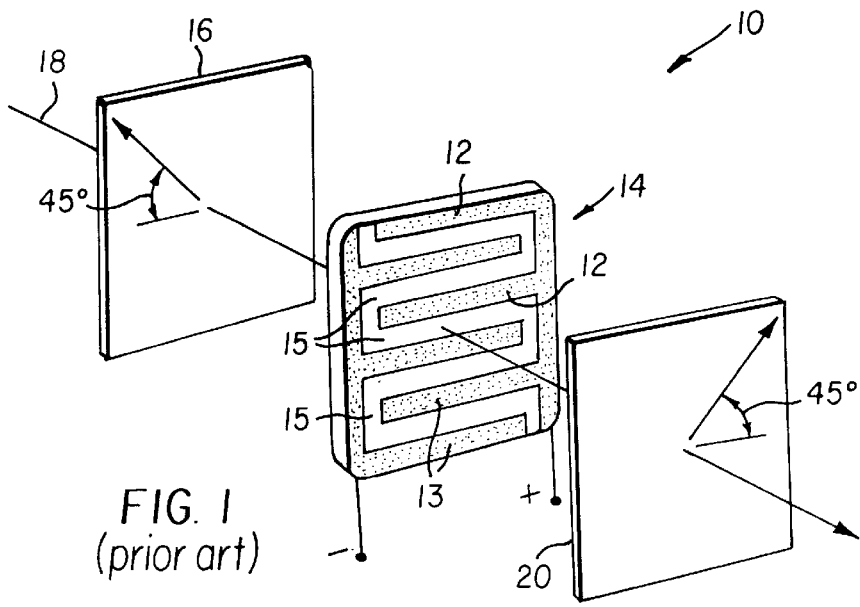
FIG. 1 is an exploded perspective view, partially in schematic, of an electro-optic modulator according to the prior art.
Figure 2:
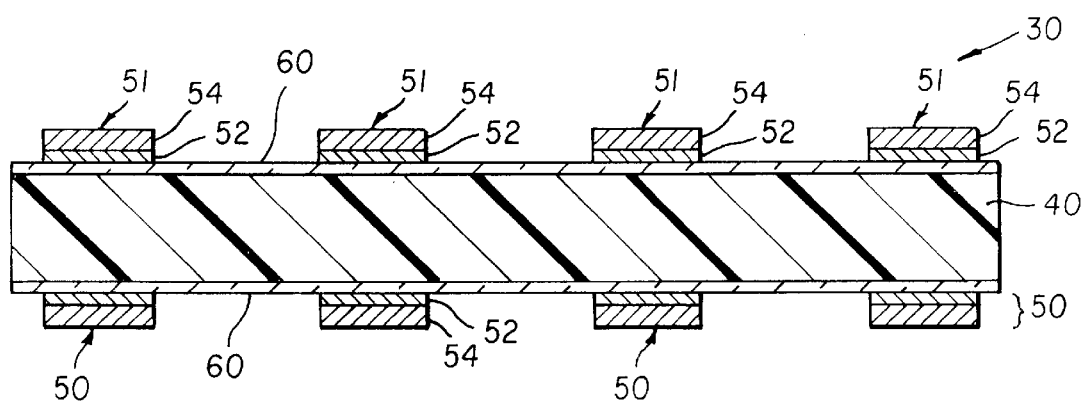
FIG. 2 is a cross-sectional view of a PLZT substrate, according to the present invention.

FIG. 2 shows a cross-sectional view of an electro-optic modulator sub-assembly referred to in general by the numeral 30. The electro-optic modulator is comprised of a PLZT substrate 40, and electrodes 50 and 51. Substrate 40 is covered by a glass passivation layer 60. Electrodes 50 and 51 are bonded to the surface of the glass passivation layer 60.

The glass passivation coating 60 consists of a single layer of an evaporated electronic grade glass. This means that it is a simple glass with few components, and contains little or no alkali metals or alkali metal oxides. Alkali metals give rise to leakage current, which is current transmitted across electrode pairs. One such glass used in the preferred embodiment is Corning 7059.

If the dielectric film used for passivation has a thermal expansion coefficient different from the substrate, the differential thermal expansion will produce stress which may, in turn, produce stress bi-refringence, which is not desirable. For example, silicon dioxide, a common passivation material has a thermal of approximately 0.4 micro-inches/inch –°C. The thermal expansion of the glass should match the thermal expansion of the substrate as closely as possible, and should be within the range of 4.0 to 6.8 micro-inches/inch –°C. for a PLZT substrate. The thermal expansion of the Corning 7059 glass is 4.6 micro-inches/inch –°C., which is very close to the thermal expansion for PLZT, which is 5.4 micro-inches/inch –°C.

The evaporation of most oxides used for passivation, requires heating the substrates to temperatures of 200° C. for glass or dielectric films. Heating the PLZT substrate to high temperatures under vacuum evaporates off the lead oxide in the ceramic, which is undesirable, and changes the properties of the PLZT substrate. An advantage of the process is that the evaporation can be performed without substrate heating. The glass is evaporated by electron beam in a partial pressure of oxygen, at between $10^{-3}$ and $10^{-4}$ Torr, at room temperature. Reducing the pressure removes the surface moisture, eliminating the need to heat the substrate. Most glasses distill when they are evaporated, that is, the higher vapor pressure constituents evaporate first. The resulting film is then very different from the starting material. Corning 7059 glass evaporates essentially without significant distillation. The resulting thin films of glass are amorphous, adhere well to almost all surfaces, and have low stress.

The thickness of the Corning 7059 glass coating can be adjusted to achieve maximum transmission of the light through the modulator. The index of refraction of PLZT at 500 nm is 2.5. To achieve maximum transmission with this coating, the thickness of the coating should have an optical path thickness equal to one quarter (¼) of the wavelength of the incident light. The modulators used in the present output writers have light incident normal to the surface so the optical path thickness is then simply equal to the index of refraction times the thickness of the Corning 7059. At 500 nm, the index of refraction of Corning 7059 is 1.5345 and a quarter wave thickness of Corning 7059 is 0.0878 microns.

Figure 3:
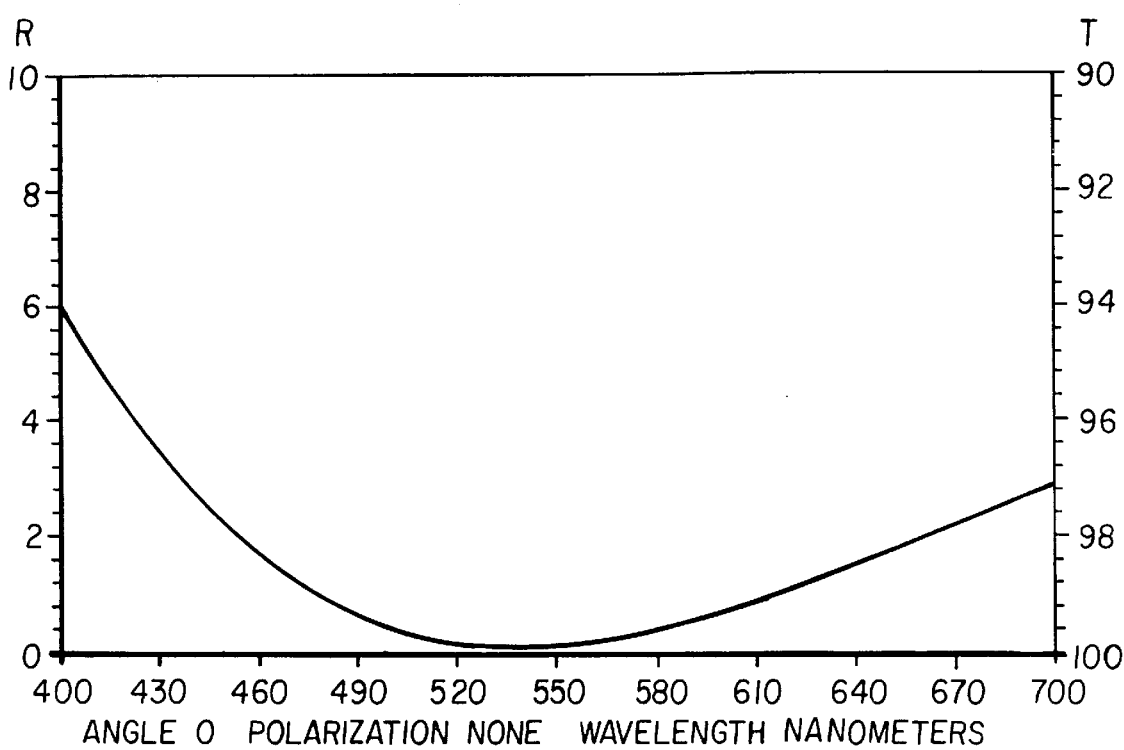
FIG. 3 is a plot of reflectivity as a function of wavelength for a glass passivation layer according to the present invention.

FIG. 3 shows a plot of the reflectivity (R) through a single surface of PLZT coating with a 0.0878 thickness of Corning 7059. The reflectivity at 500 nm is close to 0. For uncoated PLZT, the reflectivity from a single surface is 18.4%. Since the transmission is simply 1 minus the reflectivity, the transmission through a single surface is increased from 81.6% to almost 100% by application of a quarter wavelength thickness of glass. For both surfaces of the substrate, light transmission is increased from 66.5% to almost 100%. With an adhesive or acrylic coating instead of the 7059, the transmission is increased from 66.5% to approximately 88%.

Figure 4:
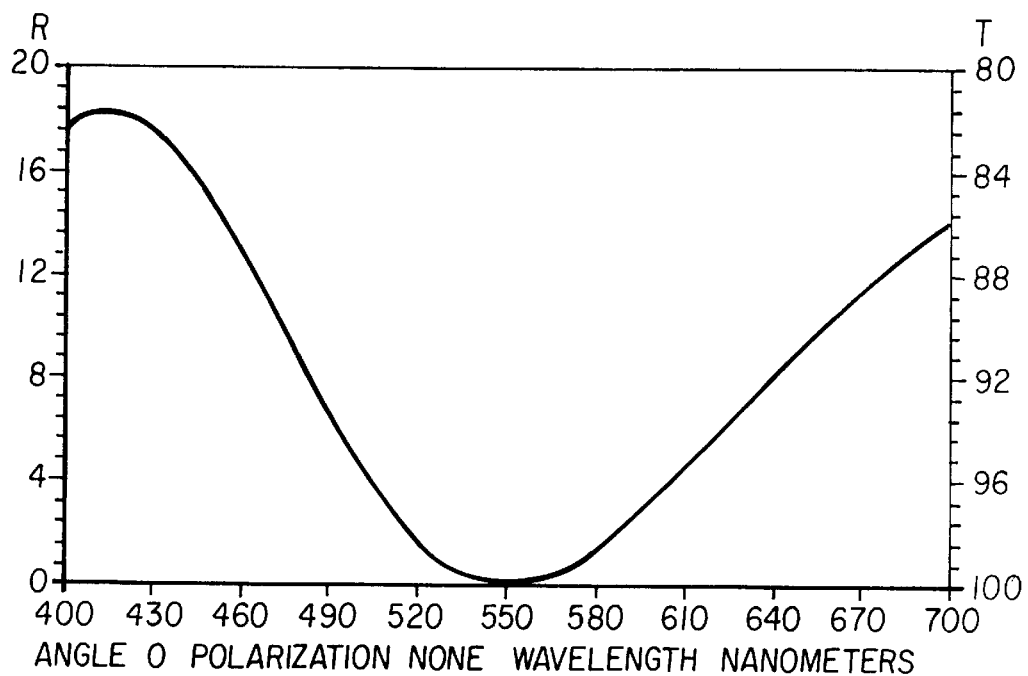
FIG. 4 is a plot of reflectivity as a function of wavelength for a glass passivation layer according to the present invention.

Although this example was done for light of a wavelength of 500 nm at normal incidence, it is a simple matter to adjust the thickness to achieve maximum transmission for a different wavelength or different incident angles. The thickness can also be increased from ¼ wave to ¾ wave, shown in FIG. 4, or any multiple odd number of quarter waves if a thicker layer of Corning 7059 is desired at the expense of narrowing the transmission band, which may be useful for monochromatic light sources.

In one embodiment, glass is evaporated onto the PLZT substrate before the attachment of electrodes 50 and 51. This embodiment is shown in FIG. 2. Electrodes 50 and 51 are then evaporated on top of the glass 60. In this embodiment, electrodes 50 and 51 consist of a layer of tantalum 52, applied directly to glass 60, followed by a layer of gold 54. The tantalum layer is approximately 0.070 microns thick. The layer of gold 54, approximately 0.30 microns thick, is applied on top of the layer of tantalum. There is excellent adhesion of the glass to the PLZT and good adhesion of the tantalum to the glass.

Figure 5:
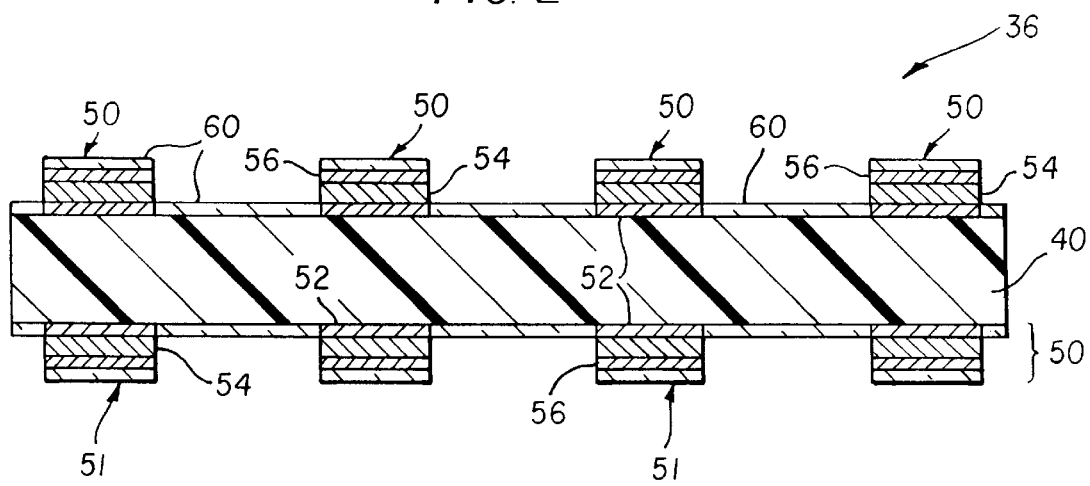
FIG. 5 is a cross-sectional view of an alternate embodiment of the present invention.

In the preferred embodiment, shown in FIG. 5, the electrodes 50 and 51, are evaporated onto the PLZT substrate 40. The electrodes consist of a layer of tantalum 52, between 500 and 1000 Angstroms thick, followed by a 5000 Angstroms layer of gold 54. If the glass 60 was evaporated over the electrodes, the glass would not stick to the gold. Evaporated oxides such as Corning 7059 will only adhere well to metals having a stable surface oxide. It is, therefore, necessary to evaporate a thin layer of a refractory metal over the gold to function as an adhesion promoter. Metals which may be used are nickel, chrome or titanium. In the preferred embodiment, a 50 to 500 Angstroms thick layer of nickel 56 is used.

It is desirable to solder to the metallized electrodes in order to attach wires to the modulator to connect it to the drive electronics. It is difficult solder to chrome, titanium, or nickel, especially with a layer of glass over the electrodes. In order to keep the nickel surface free from glass, it must be masked. This can be accomplished by using a rigid stencil evaporation mask. Since substrate heat is not necessary for the evaporation of Corning 7059, a photoresist lift-off mask can be used. A photoresist specifically designed for lift-off processing, such as Olin Hunt BPRS series, will work adequately. First, the entire substrate is coated with photoresist. A photolithographic mask is used to expose all areas of the modulator, except areas to which the leads will be soldered. Glass is then evaporated over the entire wafer. The photoresist under the glass, covering the areas of the modulator to which the leads will be soldered, is then dissolved with acetone, lifting off the glass above it, providing a glass-free surface to solder to.

Testing of modulators made with these methods have shown that the glass layer passivates the PLZT substrate and results in low leakage electro-optic modulators. The anti-reflective performance of the glass coating also is good. An additional advantage of the present invention is improved manufacturing yield. Prior art processes using an acrylic coating and a Sylguard adhesive to both passivate and minimize stress to the modulator, often had yields less than 50%. The present invention improves the yield to better than 95%.

Another advantage of the present invention is improved light transmission. The electronic glass works well as an anti-reflective coating. The transmission through modulators according to the present invention is better than the present design. Also, glass can be evaporated without substrate heating, to produce a coating with the proper index, good adhesion and good optical properties.

| PARTS LIST | |
|---|---|
| 1. | 41. |
| 2. | 42. |
| 3. | 43. |
| 4. | 44. |
| 5. | 45. |
| 6. | 46. |
| 7. | 47. |
| 8. | 48. |
| 9. | 49. |

-continued

PARTS LIST

| | | | |
|---|---|---|---|
| 10. | Electro-optic modulator | 50. | Electrodes |
| 11. | | 51. | Electrodes |
| 12. | First electrodes | 52. | Tantalum layer |
| 13. | Second electrodes | 53. | |
| 14. | PLZT substrate | 54. | Gold layer |
| 15. | Gaps | 55. | |
| 16. | First polarizer | 56. | Nickel layer |
| 17. | | 57. | |
| 18. | Light beam | 58. | |
| 19. | | 59. | |
| 20. | Second polarizer | 60. | Glass passivation layer |
| 21. | | 61. | |
| 22. | | 62. | |
| 23. | | 63. | |
| 24. | | 64. | |
| 25. | | 65. | |
| 26. | | 66. | |
| 27. | | 67. | |
| 28. | | 68. | |
| 29. | | 69. | |
| 30. | Electro-optic modulator | 70. | |
| 31. | | 71. | |
| 32. | | 72. | |
| 33. | | 73. | |
| 34. | | 74. | |
| 35. | | 75. | |
| 36. | Electro-optic modulator | 76. | |
| 37. | | 77. | |
| 38. | | 78. | |
| 39. | | 79. | |
| 40. | PLZT substrate | 80. | |

We claim:

1. A method of fabricating an electro-optic modulator, said method comprising:

coating a ferro-electric ceramic substrate with a layer of transparent, water-impermeable glass, wherein said glass is evaporated onto said substrate;

forming a pattern of at least one electrode pair on at least one surface of said substrate wherein said layer of glass has a thickness equal to an odd multiple of ¼ wavelength of an incident light beam wherein said at least one electrode pair is comprised of a layer of tantalum and a layer of gold.

2. A method of fabricating an electro-optic modulator, said method comprising:

coating a ferro-electric ceramic substrate with a layer of transparent, water-impermeable glass, wherein said glass is evaporated onto said substrate;

forming a pattern of at least one electrode pair on at least one surface of said substrate wherein said layer of glass has a thickness equal to an odd multiple of ¼ wavelength of an incident light beam wherein the thermal expansion of said glass is in the range of approximately 4.0 to 6.8 micro-inches/inch –°C.

3. A method of fabricating an electro-optic modulator, said method comprising:

coating a ferro-electric ceramic substrate with a layer of transparent, water-impermeable glass, wherein said glass is evaporated onto said substrate;

forming a pattern of at least one electrode pair on at least one surface of said substrate wherein said layer of glass has a thickness equal to an odd multiple of ¼ wavelength of an incident light beam wherein the thermal expansion of said glass is approximately equal to the thermal expansion of said ferro-electric ceramic.

4. A method as in claim 1:

wherein a layer of nickel is applied over said layer of gold.

5. A method of making an electro-optic modulator said method comprising:

forming a substrate of electro-optic material with opposed first and second surfaces;

forming a first plurality of electrode pairs on the first surface, each of said pairs defining an area there between on the first surface such that an electric field is induced in the electro-optic material in the area between an electrode pair to which a voltage is applied, said electrode pairs being spaced apart on the first surface one from another by a gap;

forming a second plurality of electrode pairs on the second surface, each of said pairs defining an area there between on the second surface such that an electric field is induced in the electro-optic material in the area between an electrode pair to which a voltage is applied, said electrode pairs being spaced apart on the second surface one from another by a gap; and evaporating a layer of electronic grade glass onto said electrodes and said substrate wherein said first and second plurality of electrode pairs are formed by evaporating a layer of tantalum onto the substrate, followed by evaporating a layer of gold onto the tantalum.

6. A method of making an electro-optic modulator as in claim 5 wherein a layer of nickel is evaporated onto said gold.

7. A method of making an electro-optic modulator as in claim 6 wherein a mask is applied to said electrode pairs prior to evaporating the glass onto the electrodes.

8. A method of making an electro-optic modulator as in claim 5 wherein said glass is ¼ wavelength thick.

9. A method of making an electro-optic modulator as in claim 5 wherein said glass has a thermal expansion in the range of 4.0 to 6.8 micro-inches/inch –°C.

10. An electro-optic modulator comprising:

a substrate of electro-optic material with opposed first and second surfaces;

a first electrode pair on the first surface, said first pair defining an area therebetween on the first surface such that an electric field is induced in the electro-optic material in the area between the electrode pair when a voltage is applied to said first electrode pair; and a second electrode pair on the second surface, said second pair defining an area there between on the second surface such that an electric field is induced in the electro-optic material in the area between said second electrode pair when a voltage is applied to said second electrode pair, and a layer of electronic grade glass on at least the area between the first electrode pair and on the area between said second electrode pair wherein said layer of glass has an thickness equal to ¼ wavelength of an incident light beam; and wherein said electrode pairs are comprised of a layer of tantalum and a layer of gold.

11. An electro-optic modulator comprising:

a substrate of electro-optic material with opposed first and second surfaces;

a first electrode pair on the first surface, said first pair defining an area therebetween on the first surface such that an electric field is induced in the electro-optic material in the area between the electrode pair when a voltage is applied to said first electrode pair; and a second electrode pair on the second surface, said second pair defining an area there between on the second surface such that an electric field is induced in the electro-optic material in the area between said second electrode pair when a voltage is applied to said second electrode pair; and a layer of electronic grade glass on at least the area between the first electrode pair and on the area between said second electrode pair wherein said layer of glass has an thickness equal to ¼ wavelength of an incident light beam; and wherein the thermal expansion of said glass is in the range of approximately 4.0 to 6.8 micro-inches/inch –°C.

12. An electro-optic modulator comprising:

a substrate of electro-optic material with opposed first and second surfaces;

a first electrode pair on the first surface, said first pair defining an area therebetween on the first surface such that an electric field is induced in the electro-optic material in the area between the electrode pair when a voltage is applied to said first electrode pair; and a second electrode pair on the second surface, said second pair defining an area there between on the second surface such that an electric field is induced in the electro-optic material in the area between said second electrode pair when a voltage is applied to said second electrode pair; and a layer of electronic grade glass on at least the area between the first electrode pair and on the area between said second electrode pair wherein said layer of glass has an thickness equal to ¼ wavelength of an incident light beam; and wherein the thermal expansion of said glass is approximately equal to the thermal expansion of said substrate.

13. An electro-optic modulator as in claim 10:

wherein a layer of nickel is applied over said layer of gold.

* * * * *